March 6, 1945.   T. B. STEVENS   2,371,076
TWO ROW POTATO DIGGER AND HARVESTER
Filed May 12, 1943   4 Sheets-Sheet 3

Inventor
Thomas B. Stevens
By Clarence A. O'Brien
and Harvey B. Jacobson
Attorneys March 6, 1945. T. B. STEVENS 2,371,076
TWO ROW POTATO DIGGER AND HARVESTER
Filed May 12, 1943 4 Sheets-Sheet 4

Inventor
Thomas B. Stevens
By Clarence A. O'Brien
and Harvey B. Jacobson
Attorneys Patented Mar. 6, 1945

2,371,076

UNITED STATES PATENT OFFICE 2,371,076

TWO ROW POTATO DIGGER AND HARVESTER

Thomas B. Stevens, Wilmington, Ill.

Application May 12, 1943, Serial No. 486,709

1 Claim. (Cl. 55—9)

My invention relates to a potato digger or harvester which digs two rows at a time by being pulled between two rows forcing one row right and the other left and pulling all potatoes between the dug row and undug row. On the return trip with the same operation there will be two rows of dug potatoes together so that the pickers can pick up two rows at a time instead of only one, and thus cut the time almost in half. In the operation, the first wheel starts the row by moving part of it, then the next wheel moves the rest of the potato hill farther over, and then the picker or spider wheel finishes by forcing all potatoes out into the center between the dug and undug rows.

Another object of the invention is the frame adjustment for height, so that one or the other of the front and rear bars of the frame may be set higher than the other. Also adjustment for width of the frame is provided for on its front and rear bars as also for tilting the wheels out of the vertical plane.

The invention is also applicable to cultivators, pulverizers and other agricultural machines.

In the accompanying drawings one embodiment of my invention is illustrated, wherein:

Figure 6 is a detail of a bracket for securing the wheels in position on the frame.

Figure 7 is a perspective view of angle connection and brace between the frame and a cross bar thereon; and Figure 8 shows one of the wheels in tilted position, a cross section along line 8—8 of Figure 1.

In the figures like numerals relate to the same parts.

Figure 1:
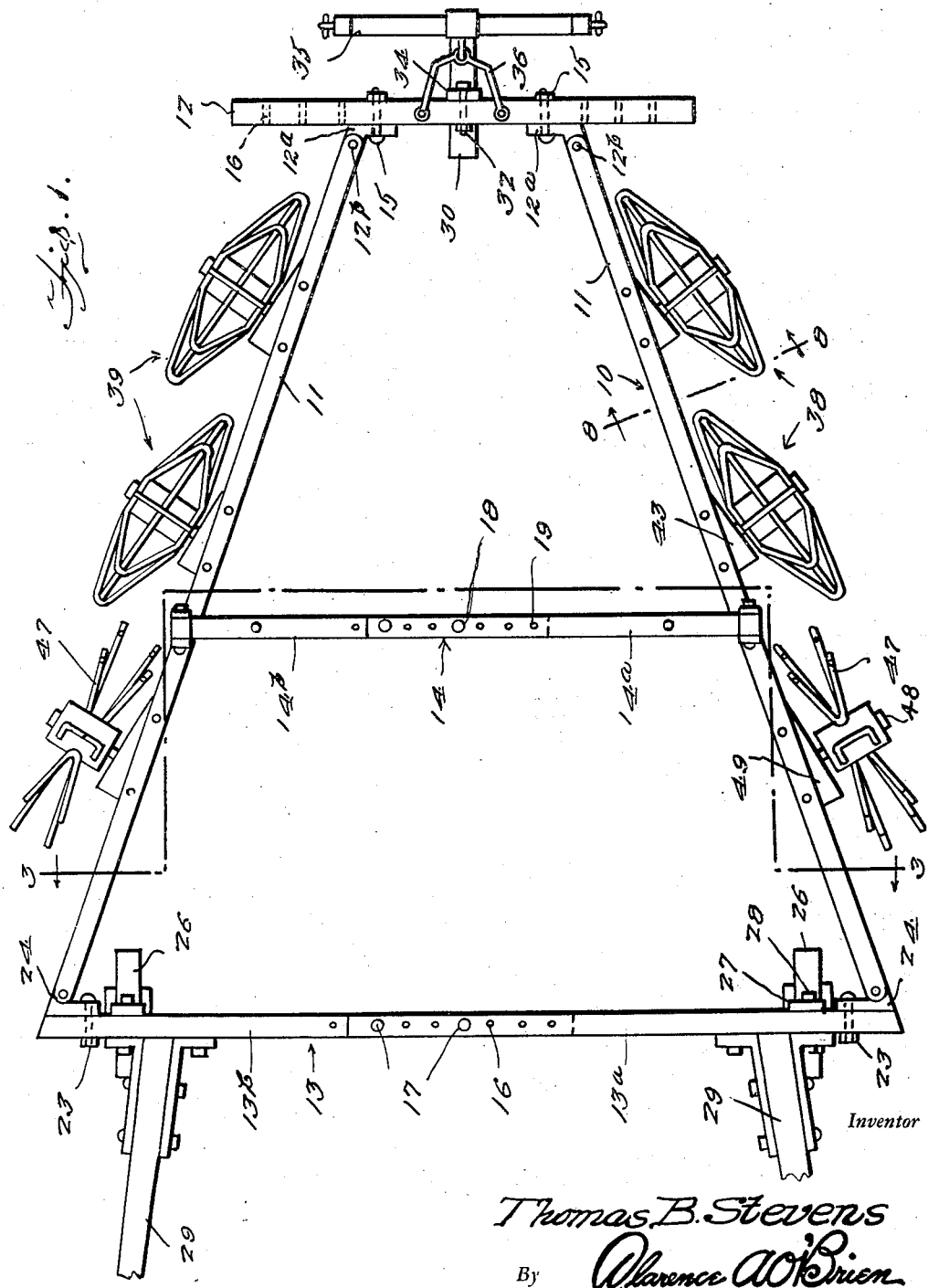
Figure 1 is a top plan view of the machine.
Figure 2:
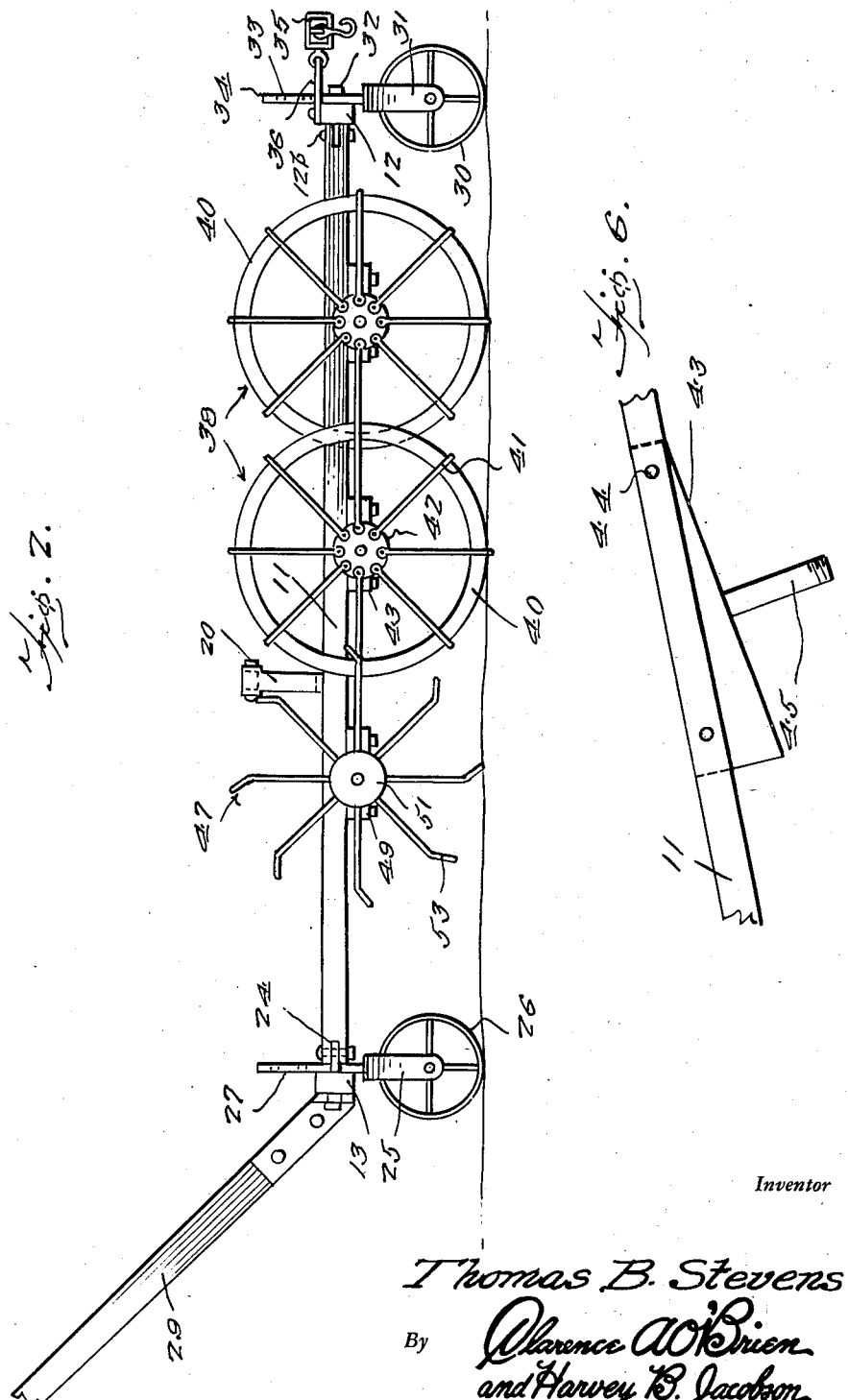
Figure 2 is a side elevation of Figure 1.

The potato digging machine comprises a frame, generally denoted by numeral 10 consisting of a front member or beam 12, a rear member or beam 13, a cross brace 14 for bracing the side members 11 of the frame. The side members 11 are situated symmetrically on both sides of the center line of the machine as seen best in Figure 1. The front ends of the two members 11 are secured to the front beam 12 by a hinge member 12a with bolts 12b and securing bolts 15 engaging in the adjustment holes 16 of the beam in adjustable manner so that the ends of the side members or runners 11 may be moved in or out along the front beam for narrowing or widening the frame 10 or swung around bolts 15 as pivots thereby tilting wheels 39 and 47. Similarly the rear ends of the side members or runners 11 may be set further apart or closer together by means of the telescopically constructed rear member or beam 13. This beam is provided with a right hand top leaf 13a and a left hand bottom leaf 13b. Along their adjacent, interengaging inner ends these sliding leaves are provided with a series of holes 16 for connecting bolts 17. In this manner, by adjusting the length of the beam 13, the desired width of the rear end of the frame will be obtained and then by applying the bolts 17 in the corresponding holes 16, a rigid frame construction is obtained. The rear ends of the side runners 11 are adjustably secured in place to the ends of the rear beam 13 by bolts 23 and hinge brackets 24, so that by the movement in or out of the leaves 13a and 13b of the said beam 13, the side runners 11 will be correspondingly set apart for the desired width of the frame. By swinging the brackets 24 around their bolts 23 the same tilting as at the front end will be accomplished.

Figure 3:
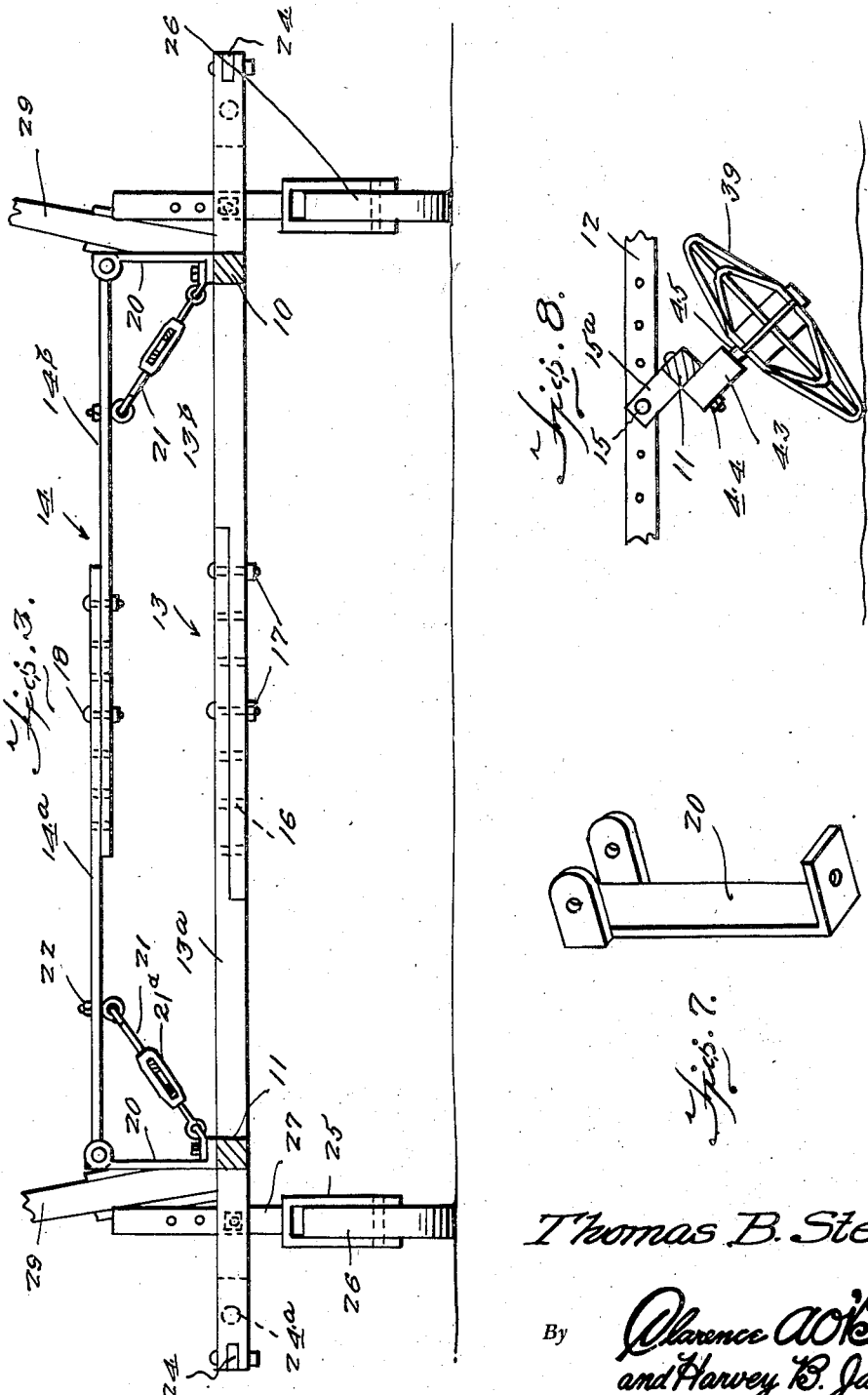
Figure 3 is a transverse section along the line 3—3 of Figure 1.
Figure 4:
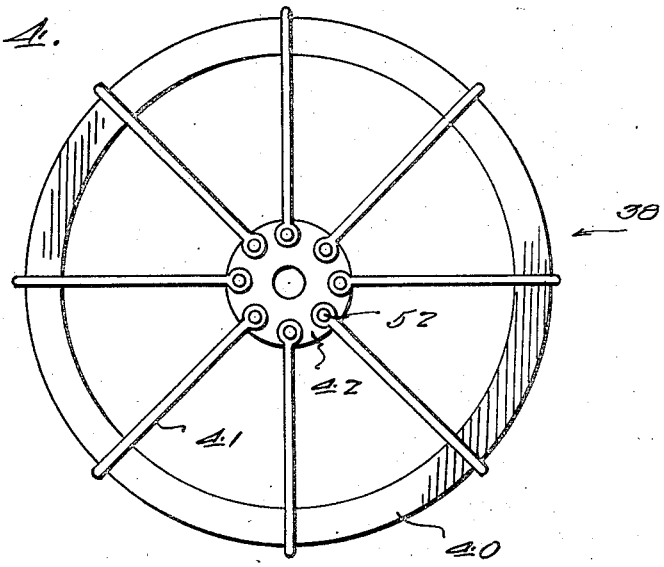
Figure 4 is a side elevation of a digger wheel.
Figure 5:
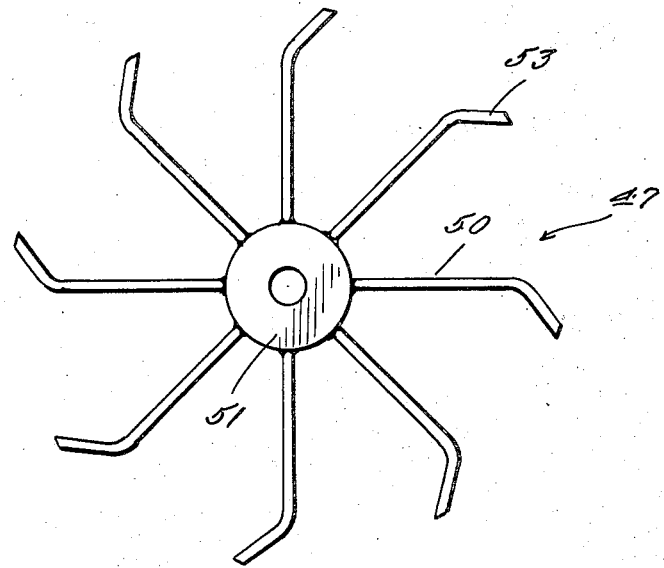
Figure 5 is a similar view of a spider or scraper wheel.

In order to still further strengthen the frame construction a cross brace 14 also is provided, placed about midway between the front beam 12 and the rear beam 13 and preferably parallel thereto. This brace is also telescopic being composed of two sliding metal bands 14a and 14b joined together by bolts 18 for which purpose a series of bolt holes 19 have been provided for extending or shortening the brace according to the desired width of the frame 10 and the adjusted length of the beam 13. This brace 14 is at each end adjustably secured to the side runners 11 by means of an angle brace which consists of a perpendicular member 20 and the obliquely thereto placed link members 21, see Figures 3 and 7. The link member 21 is adjustable as to length by the screw-connection 21a and has an eyelet at each end in order to be permanently secured on top of the side runners 11 and to the brace 14 by means of eye bolts 22 or the like.

For steering the potato machine during operation I provide suitable handle bars 29 attached to the rear beam 13 of the frame and depending from said beam 13 is shown a pair of forked bearings 25 for traction wheels 26. Each forked bearing has an upright rod or arm 27 provided with a row of holes for bolts 28 for adjustable attachment up or down to the beam 13. By this means the rear end of the frame can be tilted, that is, raised or lowered as required with relation to the front end of the frame.

Likewise the front end of the frame is provided with one traction wheel 30 running in a similarly constructed fork bearing 31 also bolted on to the frame 10 on the front beam 12 by bolts 32. This forked bearing can also be adjusted up or down by the use of different holes 33 on the bearing arm 34. This provides an additional means for tilting the frame 10.

The front beam also carries means for pulling here shown for horse-draft in the form of a singletree 35, held in position by a hinge attachment 36 to the front beam 12. It will be evident a tractor may instead be used for propulsion.

The main feature of the invention resides in the provision of digging wheels of the spring type 38, 39 and spider pick-up or spreader wheels on either side of the frame 10. A pair of such digging wheels 38 is here shown on the left hand side and another like pair 39 on the right hand side of the frame 10. All four wheels are alike in construction and consist each of a flat felly-ring or cutting blade 40 of metal and quite narrow in order that as little as possible of the loosened soil may stick to it, but be thrown over the inner edge of the blade. Spokes 41 which are welded or riveted to the ring or blade 40, connect the latter with the hub 42 to which they are bolted or secured in the usual manner. A bearing block 43 of wedge shape, Figure 6, is secured by bolts 44 to the runner 11 and provided with a stub shaft 45 upon which the wheel hub 42 rotates.

As seen in Figure 1, when the bearing blocks have been secured in position, the two digging wheels of the pair 38 will be relatively staggered, the forward wheel being closer to the center line of the frame 10 and the rear wheel further out, so that in this manner two parallel tracks will be made in the soil. Similarly two other tracks will be made on the other side of the frame, parallel to the first ones, by the digging wheel pair 39. As already described the wheel pair 38 may be brought closer to the wheel pair 39 by the shifting of the side runners 11 in the frame and consequently also the pairs of resulting tracks will be closer together.

It will be seen from Figure 1 that the wheel pairs 38 are not set parallel to the wheel pair 39 but set at a skew thereto as to the axis of the apparatus. In other words, their front ends are closer together than their rear ends, so that they actually do not cut a furrow in the soil but scrape it to one side as they travel along the ground. In Figure 8 is indicated how the wheels 38, 39 and 47 all being mounted on the runners 11 can be tilted out of the perpendicular by turning said runners and securing them by means of bolts and brackets 15, 15a and the cross brace 14 and brace members 20, 21.

Behind the two rear wheels 40 are shown spider-wheels or spreader wheels 47, one on each side of the frame 10, they are also offset laterally and set at a skew to the frame 10 and each mounted to revolve on a stub shaft 48 carried by the wedge block 49 fixed in the same manner as the ring-disk wheels on the frame. In this case the wheel spokes 50 are as before secured to the wheel hub 51. There is no rim attached to the spokes, but their outer free ends 53 are bent rearward as seen from the top, so that when the spider wheels 47 roll along the ground, the spoke ends or points 53 will push outwardly any potatoes in the soft soil left by the preceding wheels.

After one row has thus been plowed on both sides by the machine, the frame is then turned around for its return trip and shifted sideways across another row of potato vines to straddle the same.

As will now be understood, this machine is a two row digger which will cut the time in half for digging and thereby save much labor and in addition it will uncover all potatoes left in the ground and covered by the dirt, so that no after picking will be necessary.

It is evident that the front and rear beams 12 and 13 may be constructed alike, so that for instance both may be telescopic for adjusting the width of the frame similar to the cross brace 14 or all three may be provided with bolt holes for securing the ends of the side runners 11 for the same purpose.

Although there are set forth and described herein preferred embodiments of my invention, it is to be definitely understood that I do not desire to limit the application of the invention thereto, and any change or changes may be made in the materials, and in the structure and arrangement of the parts, within the spirit of the invention and the scope of the subjoined claim.

Having described the invention, what is claimed as new is:

A double row potato digging machine, comprising a frame, pairs of digging wheels of the spring type and spider wheels thereon and means for adjusting the angularity and width of the frame and the angularity and lateral distance between the wheels during operation; said spider wheels being arranged behind said digging wheels and laterally spaced therefrom, the spider wheels each consisting of a hub and spokes made of straight rods of uniform cross section without rim, the free ends of the spokes being bent in hook shape so as to scrape the soil outwardly sideways when the machine moves forward and the digging wheels each consisting of a thin felly-ring, a hub and wire spokes connecting hub and ring.

THOMAS B. STEVENS.